United States Patent
Yaqoob et al.

(10) Patent No.: US 12,537,457 B2
(45) Date of Patent: Jan. 27, 2026

(54) ISOLATED BIDIRECTIONAL ACTIVE-HALF-BRIDGE RESONANT DC-DC POWER CONVERTER

(71) Applicant: Huawei Digital Power Technologies Co., Ltd., Shenzhen (CN)

(72) Inventors: Muhammad Yaqoob, Kista (SE); Grover Victor Torrico-Bascopé, Kista (SE)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 286 days.

(21) Appl. No.: 18/363,990

(22) Filed: Aug. 2, 2023

(65) Prior Publication Data
US 2024/0007007 A1 Jan. 4, 2024

Related U.S. Application Data

(63) Continuation of application No. PCT/EP2021/052486, filed on Feb. 3, 2021.

(51) Int. Cl.
*H02M 3/335* (2006.01)
*H02M 1/00* (2006.01)
*H02M 3/00* (2006.01)

(52) U.S. Cl.
CPC ..... *H02M 3/33584* (2013.01); *H02M 1/0058* (2021.05); *H02M 3/01* (2021.05)

(58) Field of Classification Search
CPC ......... H02M 3/33584; H02M 3/33571; H02M 3/01; H02M 1/0003; H02M 1/0058; H02M 1/14
See application file for complete search history.

(56) References Cited

U.S. PATENT DOCUMENTS

| 7,638,904 B2 | 12/2009 | Shoji et al. |
| 2006/0139823 A1* | 6/2006 | Shoji ........ H02M 1/34 |
| 2017/0317601 A1 | 11/2017 | Jin et al. |

FOREIGN PATENT DOCUMENTS

| CN | 104811043 A * | 7/2015 | ........ H02M 1/32 |
| WO | 2012071735 A1 | 6/2012 | |

OTHER PUBLICATIONS

H.-J. Chiu and L.-W. Lin, "A bidirectional DC-DC converter for fuel cell electric vehicle driving system," in IEEE Transactions on Power Electronics, vol. 21, No. 4, pp. 950-958, Jul. 2006, doi: 10.1109/TPEL.2006.876863. (Year: 2006).*

(Continued)

*Primary Examiner* — Gary L Laxton
*Assistant Examiner* — Jennifer C Caulk
(74) *Attorney, Agent, or Firm* — Maier & Maier, PLLC (57) ABSTRACT

An isolated bidirectional active-half-bridge resonant DC-DC power conversion apparatus employs dual control strategies to regulate bi-directional power flow between two DC sources. The apparatus includes a first half bridge switching network configured to convert a first DC power to an AC power. A series resonant impedance transfers the AC power to a first winding of a transformer. A first inductor and a second inductor are connected in series across a second winding of the transformer and form a positive DC node. A second half bridge switching network is connected in parallel with a first clamping capacitor, with a central node connected to the first end of the second winding. A third half bridge switching network is connected in parallel with a second clamping capacitor, with a central node connected with the second end of the second winding. The clamping capacitors are connected with a negative DC node.

17 Claims, 6 Drawing Sheets

(56) References Cited

OTHER PUBLICATIONS

Sha et al., "High-Efficiency Current-Fed Dual Active Bridge DC-DC Converter With ZVS Achievement Throughout Full Range of Load Using Optimized Switching Patterns", IEEE Transactions on Power Electronics, vol. 33, No. 2, Feb. 2018, 11 pages.
Hiltunen et al., "Variable-Frequency Phase Shift Modulation of a Dual Active Bridge Converter", IEEE Transactions on Power Electronics, vol. 30, No. 12, Dec. 2015, 11 pages.
Li et al., "Performance Analysis of a Current-Fed Bidirectional LLC Resonant Converter", IECON 2016—42nd Annual Conference of the IEEE Industrial Electronics Society, Oct. 23-26, 2016, 6 pages.
Chiu et al., "A Bidirectional DC/DC Converter for Fuel Cell Electric Vehicle Driving System", IEEE Transactions on Power Electronics, vol. 21, No. 4, Jul. 2006, 10 pages.
Wu et al., "Fixed-Frequency PWM-Controlled Bidirectional Current-Fed Soft-Switching Series-Resonant Converter for Energy Storage Applications", IEEE Transactions on Industrial Electronics, vol. 64, No. 8, Aug. 2017, 12 pages.
Kong et al., "Quasi-fixed Frequency and Phase Modulation Synchronous Control Based LCC Resonant Converter", IEEE, Nov. 22, 2019, 6 pages.

\* cited by examiner

ISOLATED BIDIRECTIONAL ACTIVE-HALF-BRIDGE RESONANT DC-DC POWER CONVERTER

CROSS-REFERENCE TO RELATED APPLICATION

This application is a continuation of International Application No. PCT/EP2021/052486, filed on Feb. 3, 2021, the disclosure if which is hereby incorporated by reference in its entirety.

TECHNICAL FIELD

The aspects of the embodiments relate to power conversion apparatus and resonant DC-DC power converters.

BACKGROUND

DC-DC power converters having variable input and output voltages are useful in a wide variety of power conversion and distribution applications. These include for example, AC-DC rectifier systems used to power telecommunications equipment, DC-AC inverter systems as used in photovoltaic applications, and other DC-DC conversion applications.

DC-DC converter applications may achieve optimal and efficient performance when operating with wide-range input output voltage capability, bi-directional power flow, zero-voltage switching (ZVS), minimum root-mean-square (rms) current through the transformer, and ease in control. High power density and reliability are achieved when a DC-DC converter is operated without DC bias in the transformer currents, with small current ripple at the low voltage (LV) side output, a reduced number of switching devices, and reduced number of magnetic components.

Conventional solutions based on pure inductive impedances suffer from higher current stresses, higher order harmonics, and difficulty achieving ZVS with minimum rms transformer current. ZVS operation can create non-zero current ripple in the LV side requiring larger output capacitors thereby lowering power density. Bi-directional operation of these conventional solutions requires additional DC current blocking capacitors.

Other solutions based on resonant impedances having two inductors and a capacitor (LLC) suffer similar drawbacks including complex control leading to the need for additional filter capacitors and DC blocking capacitors. Higher order impedances, such as LLCL configurations, fail to solve the above-mentioned drawbacks and further reduce power density due to the additional impedance elements.

Thus, there is a need for improved DC-DC power converters having simplified control strategies, high efficiency, and high power density. Accordingly, it would be desirable to provide an apparatus that addresses at least some of the problems described above.

SUMMARY

The aspects of the embodiments are directed to an isolated bidirectional active-half-bridge resonant (AHBR) DC-DC power conversion apparatus employing a controller having dual compensation schemes configured to regulate bi-directional power flow between two DC power sources. The aspects of the embodiments provide efficient high-density DC-DC power conversion enhanced by a novel dual mode controller design strategy.

According to a first aspect, the above and further objectives and advantages are obtained by an apparatus. In one embodiment, the apparatus includes a first switching network connected between a first positive DC node and a first negative DC node, the first switching network including a first switching device connected in series with a second switching device and forming a first central node. A resonant inductor, a resonant capacitor, and a first winding of a transformer are connected in series between the first central node and the first negative DC node. A first inductor and a second inductor are connected in series between a first end and a second end of a second winding of the transformer and form a second positive DC node between the first inductor and the second inductor. A second switching network is connected in parallel with a first clamping capacitor, where the second switching network includes a third switching device connected in series with a fourth switching device thereby forming a second central node, where the second central node is connected with the first end of the second winding of the transformer. A third switching network is connected in parallel with a second clamping capacitor, where the third switching network includes a fifth switching device connected in series with a sixth switching device and forming a third central node, where the third central node is connected with the second end of the second winding of the transformer. The first clamping capacitor and the second clamping capacitor are connected with a second negative DC node. The forgoing arrangement of switching networks and power components results in a reduced number of switching devices and provides for simplified control of the power flow through the apparatus.

In a first possible implementation form of the apparatus according to the first aspect, the first inductor has the same inductance as the second inductor. Using the same inductive value for both of the first and second inductor creates similar but opposite ripple currents in both inductors allowing the ripple currents to cancel each other resulting in significantly reduced ripple current at the output.

In a second possible implementation form of the apparatus, an inductance of the first inductor is determined based on a maximum current and minimum voltage of the second DC power, a switching frequency corresponding to the maximum current and minimum voltage, and a parasitic capacitance of any of the third, fourth, fifth, and sixth switching devices. Selecting the inductor value in this way ensures zero voltage switching operation of switches in the second and third switching networks.

In a third possible implementation form of the apparatus, the apparatus includes a first DC power source connected between the first positive DC node and the first negative DC node, and a second DC power source connected between the second positive DC node and the second negative DC node. Including the power sources within the apparatus can aid analysis and design of the converter.

In a fourth possible implementation form of the apparatus, the first switching network is operated to create a first AC voltage across the first central node and the first negative DC node, and the second switching network and the third switching network are operated to create a second AC voltage across the second central node and the third central node. Creating AC voltages at these nodes promotes efficient power transfer through the resonant and magnetic components of the apparatus.

In a fifth possible implementation form of the apparatus, the second switching network and the third switching network are operated at a fifty percent duty cycle. Operating the second and third switching networks at a fifty percent duty cycle ensures ripple currents generated in the first and second inductors cancel each other.

In a sixth possible implementation form of the apparatus, the apparatus includes a controller configured to receive a first DC voltage corresponding to the first DC power source and a second DC voltage corresponding to the second DC power source. The controller includes a first control loop configured to determine a switching frequency based on a controlled voltage and a reference voltage, and a second control loop configured to determine a phase shift between the first AC voltage and the second AC voltage based on the controlled voltage, the reference voltage, and a gain, where the gain is determined based on a voltage of the first DC power and a voltage of the second DC power. A control signal generator is included in the controller, where the control signal generator is configured to receive the switching frequency and the phase shift and generate control signals adapted to operate the first switching network, the second switching network, and the third switching network in accordance with the switching frequency and the phase shift. The use of multiple control loops provides effective and efficient control over a wide range of operating conditions.

In a seventh possible implementation form of the apparatus, the controlled voltage is proportional to one of the voltage of the first DC power, the voltage of the second DC power, a current of the first DC power, and a current of the second DC power. Using different values for the controlled voltage allows the converter to be operated to produce bi-directional power flow in either voltage controlled or current controlled modes with a single controller architecture.

In an eighth possible implementation form of the apparatus the controller is configured to, when the determined switching frequency is below a predetermined maximum switching frequency, generate the control signals based on the switching frequency. When the determined switching frequency is not below the predetermined maximum switching frequency the controller is configured to generate the control signals based on the maximum switching frequency. Limiting the maximum switching frequency ensures the converter is operated within a desired range of switching frequencies over a wider operating range resulting in more efficient operation.

In a ninth possible implementation form of the apparatus when the determined switching frequency is below the predetermined maximum switching frequency, the phase shift is generated based on the gain, and when the determined switching frequency is not below the predetermined maximum switching frequency, the phase shift is generated based on a difference between the controlled voltage and the reference voltage. Switching between frequency and phase-controlled modes of operation provides efficient control over a wider range of operating conditions as compared to a single mode control scheme.

In a tenth possible implementation form of the apparatus the phase shift is set to an inverse cosine of the gain when the gain is less than a first threshold value; a predetermined minimum phase shift when the gain is between the first threshold value and a second threshold value, and an inverse cosine of an inverse of the gain when the gain is greater than a second threshold value. Control of the phase shift ensures zero voltage switching across a wider range of operating conditions and results in zero current switching where zero voltage switching is not possible.

In an eleventh possible implementation form of the apparatus, the first threshold value is determined based on a parasitic capacitance of any of the first switching device and the second switching device, and a predetermined minimum value of an output current at the second DC power source. The second threshold value is an inverse of the first threshold value. Selection of the threshold values in this fashion improves zero voltage switching operation of the converter.

In a twelfth possible implementation form of the apparatus, the parasitic capacitance of the first switching device is equal to the parasitic capacitance the second switching device. Using matched switching devices aids zero voltage switching in both switching devices across the entire operation region of the converter.

In a thirteenth possible implementation form of the apparatus, the parasitic capacitance of each of the third, fourth, fifth, and sixth switching devices is the same. Using matched devices aids zero voltage switching.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the embodiments. Additional aspects and advantages of the disclosure will be set forth in the description that follows, and in part will be clear from the description, or may be understood by practice of the embodiments.

BRIEF DESCRIPTION OF THE DRAWINGS

The embodiments will be explained in more detail with reference to the drawings, in which like references indicate like elements and.

DETAILED DESCRIPTION OF THE EMBODIMENTS

Figure 1:
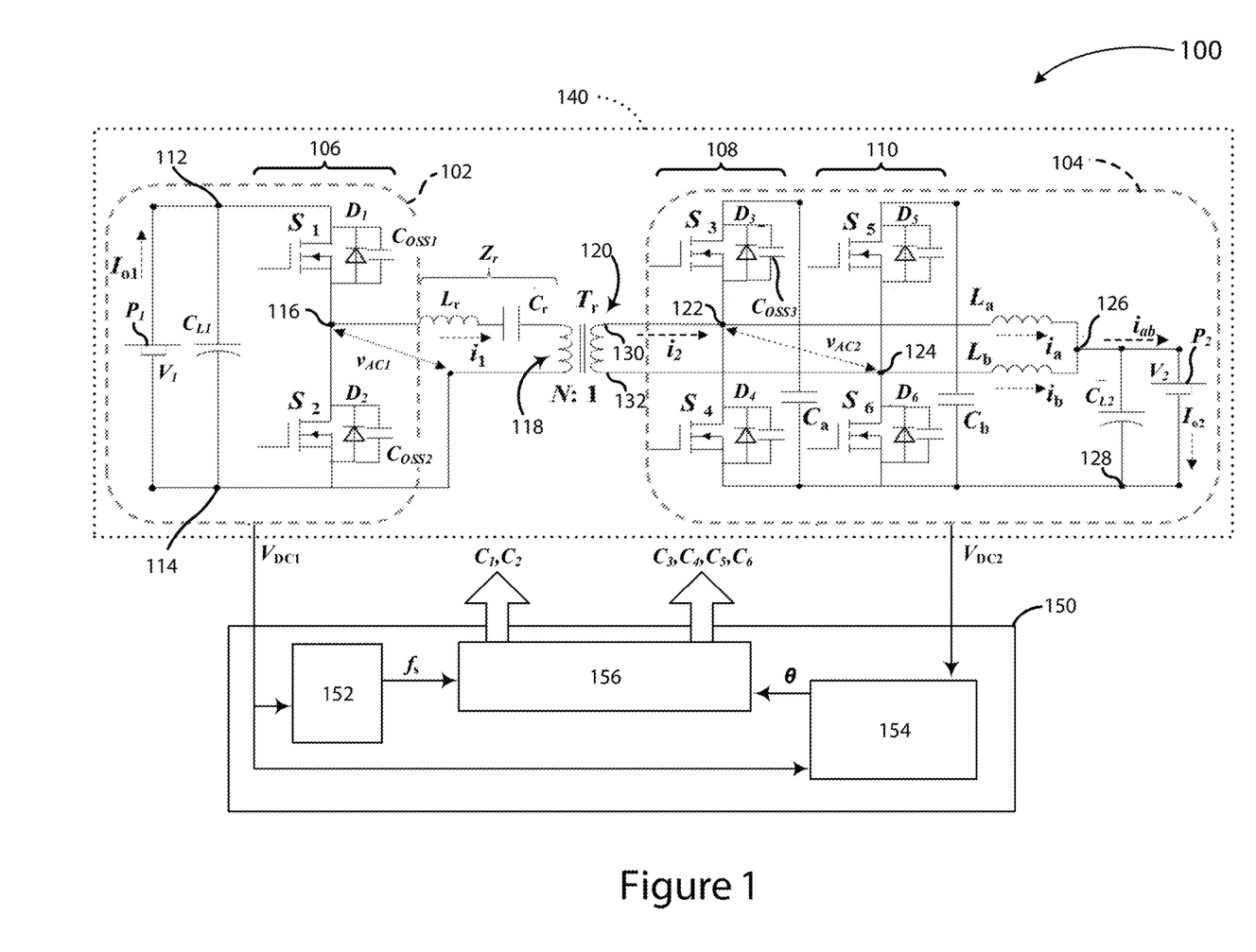
FIG. 1 illustrates a block diagram of an exemplary DC-DC converter incorporating aspects of the embodiments.

Referring to FIG. 1, a simplified block diagram of a power conversion apparatus 100 is illustrated. The apparatus 100 of the embodiments is directed to an isolated bidirectional AHBR DC-DC power conversion apparatus employing a controller 150 having dual compensation schemes 152, 154 configured to regulate power flow between two DC power sources $P_1$, $P_2$. The apparatus 100 is appropriate for use as a DC-DC converter/conversion stage of an AC-DC rectifier system for telecommunication equipment, or a DC-AC inverter system for photovoltaic (PV) applications, or other applications that may benefit from efficient high-density DC-DC power conversion.

In the example of FIG. 1, the apparatus 100 includes a first switching network 106 connected between a first positive DC node 112 and a first negative DC node 114. The first switching network 106 has a first switching device $S_1$ connected in series with a second switching device $S_2$. The connection between the first switching device $S_1$ and the second switching device $S_2$ forms a first central node 116.

A resonant inductor Lr, a resonant capacitor Cr, and a first winding 118 of a transformer Tr are connected in series between the first central node 116 and the first negative DC node 114. A first inductor La and a second inductor Lb are connected in series between a first end 130 and a second end 132 of a second winding 120 of the transformer Tr. This connection forms a second positive DC node 126 between the first inductor La and the second inductor Lb.

A second switching network 108 is connected in parallel with a first clamping capacitor Ca, the second switching network 108 has a third switching device $S_3$ connected in series with a fourth switching device $S_4$. The connection between the third switching device $S_3$ and the fourth switching device S4 forms a second central node 122. The second central node 122 is connected with the first end 130 of the second winding 120 of the transformer Tr.

A third switching network 110 is connected in parallel with a second clamping capacitor Cb. The third switching network 110 includes a fifth switching device $S_5$ connected in series with a sixth switching device $S_6$. The connection of the fifth switching device $S_5$ with the sixth switching device $S_6$ forms a third central node 124. The third central node 124 is connected with the second end 132 of the second winding 120 of the transformer Tr. The first clamping capacitor Ca and the second clamping capacitor Cb are connected with a second negative DC node 128.

The apparatus 100 includes power handling components 140, also referred to herein as a converter topology, configured to transfer electric power between a first DC power source $P_1$ and a second DC power source $P_2$. A controller 150 is included in the apparatus 100 and is configured to regulate bi-directional power flow between the first DC power source $P_1$ and the second DC power source $P_2$ by appropriately operating three switching networks 106, 108, 110, referred to herein as a first, second and third switching networks, respectively. The converter topology 140 includes a high voltage (HV) side 102 and a low voltage (LV) side 104 coupled together through a series impedance $Z_r$, also referred to herein as a series resonant impedance, and a transformer $T_r$.

As an aid to understanding, the first DC power source $P_1$ and the second DC power source $P_2$ are included within the converter topology 140. However, those skilled in the art will readily recognize that one or both of the DC power sources $P_1$ and $P_2$ may be implemented externally to the apparatus 100 without straying from the spirit and scope of the present embodiments. For example, in one embodiment the first DC power source $P_1$ may be a rectification stage, such as a power factor corrected AC-DC conversion stage, configured to convert AC grid power to DC power and as such may be implemented as a separate power conversion stage coupled to the converter topology 140.

The HV side 102 includes the first switching network 106 connected between the first positive DC node 112 and the first negative DC node 114. The first switching network 106, also referred to as a half bridge switching network, includes the first switching device $S_1$ connected in series with a second switching device $S_2$, forming the first central node 116 disposed between the first $S_1$ and second $S_2$ switching devices. In the exemplary embodiment illustrated in FIG. 1, the first switching device $S_1$ and the second switching device $S_2$ are N-channel metal oxide semiconductor field effect transistors (MOSFET). Also illustrated are the body diodes $D_1$, $D_2$, and parasitic output capacitances $C_{OSS1}$, $C_{OSS2}$ typical of many MOSFET type switching devices. Alternatively, any suitable switching device capable of efficiently switching the first DC power $P_1$ at the desired frequencies may be advantageously employed as switching devices $S_1$ and $S_2$ in the first switching network 106. In certain embodiments, it may be advantageous to implement both switching devices $S_1$ and $S_2$ using the same type of switching device. This results in each switching device, $S_1$ and $S_2$, having the same parasitic output capacitance $C_{OSS1}=C_{OSS2}$, which as will be discussed further below, has benefits with regard to zero voltage switching (ZVS).

A first DC power source $P_1$ may be coupled between the first positive DC node 112 and the first negative DC node 114 and be configured to provide or receive DC power to or from the first half bridge switching network 106. As used herein the term power source refers to any appropriate power device capable of providing and/or receiving DC power. An example of an appropriate DC power source is a battery. A battery coupled to the first DC power $P_1$ may receive DC power from the apparatus 100 while being charged and can also provide DC power when the apparatus 100 is transferring power to the second DC power source $P_2$.

In one embodiment a DC-link capacitor $C_{L1}$ may be advantageously connected in parallel with the first switching network 106. Including a DC-link capacitor $C_{L1}$ can provide advantages such as smoothing and conditioning of DC power across the first switching network 106.

The first switching network 106 is coupled to a transformer $T_r$ through a series resonant impedance $Z_r$, where the series resonant impedance $Z_r$ includes a resonant inductor $L_r$ connected in series with a resonant capacitor $C_r$. The series resonant impedance $Z_r$ is adapted to exhibit a resonant frequency $f_r$. This resonance allows a gain to be adjusted by varying the switching frequency $f_s$ of switching networks 106, 108, 110 in the converter topology 140. The series resonant impedance $Z_r$ and a first winding 118 of the transformer $T_r$ are connected in series between the first central node 116 and the first negative DC node 114. The resonant frequency $f_r$ of the series resonant impedance $Z_r$ is set below a pre-determined minimum switching frequency $f_s$ of the three switching networks 106, 108, 110.

The transformer $T_r$ includes a first winding 118 and a second winding 120 with a turn ratio between the first 118 and second 120 windings of N to one, N:1. In the illustrated embodiment 100, N is greater than one thereby making the first winding 118 the HV side 102 of the transformer $T_r$, and the second winding 120 the LV side 104. Alternatively, in certain embodiments a turn ratio having N less than one may be advantageously employed. When the turn ratio N is less than one, the HV side and LV side reverse their positions, and the second winding 120 becomes the HV side of the transformer $T_r$ and the first winding 118 becomes the LV side.

On the LV side 104, a first inductor $L_a$ and a second inductor $L_b$ are connected in series between a first end 130 and a second end 132 of the second winding 120 of the transformer $T_r$. A central node 126, disposed between the first inductor $L_a$ and the second inductor $L_b$, forms a second positive DC node 126 which is configured to be coupled with the second DC power source $P_2$. As will be discussed further below, using the same inductive value for both of the first inductor $L_a$ and the second inductor $L_b$, provides benefits with regard to the ripple current at the second DC power source $P_2$. When desired, a second DC-link capacitor $C_{L2}$ may be coupled between the second positive DC node 126 and the second negative DC node 128 and in parallel with the second DC power source P2.

Two switching networks 108, 110 are employed on the LV side 104 which, when appropriately operated, will convert the second AC voltage $v_{AC2}$ to a DC current $i_{ab}$ at the second positive DC node 126.

The second switching network 108 includes the third switching device $S_3$ and the fourth switching device $S_4$ connected in series and forming what may be referred to as a half bridge switching network. The second central node 122 formed between the third switching device $S_3$ and the fourth switching device $S_4$, is connected to a first end 130 of the second winding 120 of the transformer Tr, and a first clamping capacitor $C_a$ is connected in parallel with the second switching network 108. One end of the first clamping capacitor $C_a$ is connected to the second negative DC node 128.

The third switching network 110 includes the fifth switching device $S_5$ and the sixth switching device $S_6$ connected in series and forming the third central node 124. The third central node is connected to a second end 132 of the second winding 120 of the transformer Tr. The second clamping capacitor $C_b$ is connected in parallel with the third switching network 110 with one end of the second clamping capacitor $C_b$ connected to the second negative DC node 128.

Output power of the exemplary apparatus 100 is regulated by a controller 150 configured to receive control signals $V_{DC1}$ and $V_{DC2}$, and produce six switch control signals $C_1, \ldots, C_6$, configured to operate the three switching networks 106, 108, 110. The first DC voltage $V_{DC1}$ and a second DC voltage $V_{DC2}$ are proportional to a voltage of the first DC power $P_1$ and the second DC power $P_2$ respectively, and each control signal $C_1, \ldots, C_6$ is adapted to drive a corresponding one switching device $S_1, \ldots, S_6$, of the three half-bridge switching networks 106, 108, 110.

In certain embodiments gate drivers (not shown) may be disposed between the controller 150 and the switching devices $S_1, \ldots, S_6$, to isolate the controller 150 from the converter topology 140. Each control signal $C_1, \ldots, C_6$, is generated by a gate driver configured to amplify the control signal while introducing a negligibly small delay.

Two control loops are included in the controller 150. A first control loop 152 is configured to generate a switching frequency $f_s$ and the second control loop 154 is configured to generate a phase shift $\theta$. The switching frequency $f_s$ and the phase shift $\theta$, referred to herein as the control parameters, are used to operate the three half-bridge switching networks 106, 108, 110 where the switching frequency $f_s$ controls a frequency of the two AC voltages $v_{AC1}$, $v_{AC2}$ and the phase shift $\theta$ controls a phase shift between the first AC voltage $v_{AC1}$ and the second AC voltage $v_{AC1}$.

The two control parameters, switching frequency $f_s$ and phase shift $\theta$, are sent to a control signal generator 156, or control signal generation algorithm, configured to generate control signals $C_1, \ldots, C_6$ adapted to operate the three switching networks 106, 108, 110 to produce the desired switching frequency $f_s$ and phase shift $\theta$ within the converter topology 140.

The resonant capacitor $C_r$ included in the series resonant impedance $Z_r$ acts as a blocking capacitor to remove inherent DC bias generated by the HV side 102 of the half bridge switching network 106. On the LV side 104 the two clamped capacitors, $C_a$ and $C_b$, which are connected in parallel with each of the LV side 104 switching networks 108 and 110 respectively, remove the DC bias generated by the LV side switching networks 108, 110.

Use of a single half bridge switching network 106 on the HV side 102 along with two interleaved half bridge switching networks 108, 110 on the LV side 104 results in a power conversion apparatus 100 having a reduced number of switching devices $S_1$-$S_6$ as compared to the number of switching devices used in many conventional power converters.

Figure 2:
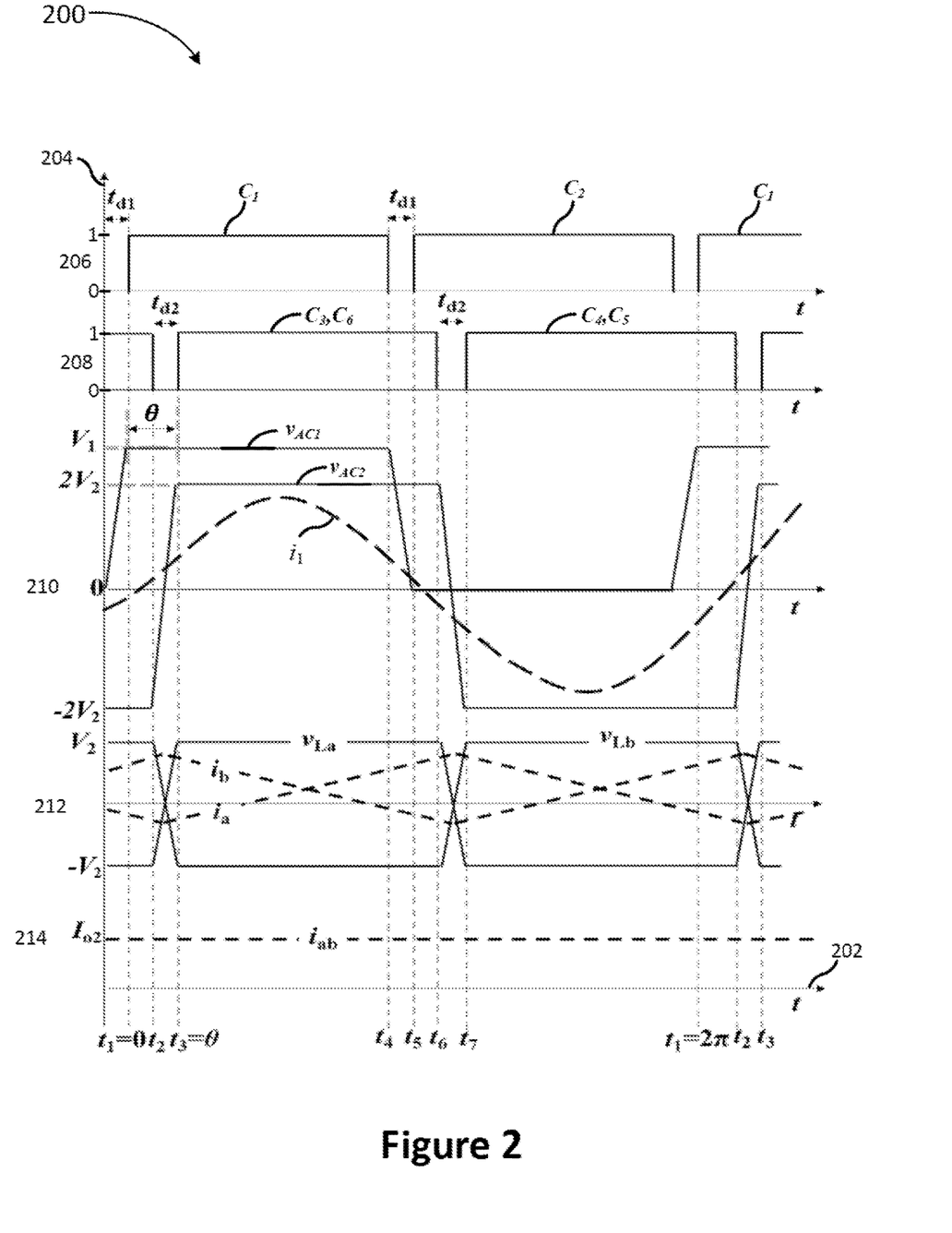
FIG. 2 illustrates graphs showing primary waveforms for an isolated bidirectional DC-DC power converter incorporating aspects of the embodiments.

FIG. 2 illustrates graphs 200 showing the primary waveforms for an isolated bidirectional AHBR DC-DC power converter incorporating aspects of the embodiments. The primary waveforms illustrated in graphs 200 are representative of primary waveforms generated within an exemplary isolated bidirectional AHBR DC-DC power converter such as the apparatus 100 described above and with respect to FIG. 1. In the graphs 200, time is depicted along a horizontal axis 202 increasing to the right while magnitude is depicted in each of the graphs 206, 208, 210, 212, and 214 along a vertical axis 204 increasing upwards.

The first two graphs 206 and 208 illustrate the six control signals $C_1, \ldots, C_6$ generated by the controller 150 and used to operate the six switching devices $S_1, S_2, \ldots, S_6$ in each of the three half-bridge switching networks 106, 108, 110. In the graphs 206, 208 a control signal with a value of one (1) turns the corresponding switching device on and a value of zero (0) turns the corresponding switching device off, where "on" means the switching device is conducting and "off" means the switching device is not conducting.

Graph 206 illustrates control signals $C_1$ and $C_2$ used to operate corresponding switching devices $S_1$ and $S_2$ in the first half-bridge switching network 106. The first half bridge switching network 106 is operated at a fifty percent (50%) duty cycle where the "on" time of each switching device $S_1$, $S_2$ is the same. During a dead time $t_{d1}$ both control signals $C_1$ and $C_2$ are set to zero to allow for proper switching of the first half-bridge switching network 106.

Graph 208 illustrates control signals $C_3$, $C_4$, $C_5$, and $C_6$ used to operate corresponding switching devices $S_3$, $S_4$, $S_5$, and $S_6$ in the two interleaved half-bridge switching networks 108 and 110. The second half-bridge switching network 108 and the third half-bridge switching network 110 are operated at a fifty percent (50%) duty cycle where the "on" time of each switch $S_3$, $S_4$, $S_5$, and $S_6$ is the same. A dead time $t_{d2}$, where all four control signals $C_3$, $C_4$, $C_5$, and $C_6$ are set to zero, allows for proper switching of the two interleaved half-bridge switching networks 108, 110.

Graph 210 illustrates the first AC voltage $v_{AC1}$ generated by the first switching network 106, the second AC voltage $v_{AC2}$ generated by the two interleaved half bridge switching networks 108 and 110, and the currents $i_1$ and $i_2$ generated within the first winding 118 and the second winding 120 of the transformer $T_r$. The first AC voltage $v_{AC1}$ varies between the voltage $V_1$ of the first DC power source $P_1$ and zero volts. The second AC voltage $v_{AC2}$ varies between twice the voltage $V_2$ of the second DC power source $P_2$, labelled as $2V_2$ in graph 210, and an equal negative voltage $-2V_2$. The AC voltages $v_{AC1}$ and $v_{AC2}$ create a nearly sinusoidal current $i_1$ through the resonant inductor $L_r$. Power flow through the converter is controlled by the phase shift $\theta$ between the first AC voltage $v_{AC1}$ and the second AC voltage $v_{AC2}$.

As can be seen in the graph 210, the AC voltages $v_{AC1}$ and $v_{AC2}$ creates a nearly sinusoidal current $i_1$ by exciting the series resonant impedance $Z_r$. A second current $i_2$ flowing through the second winding 120 (not shown in the graph 210) has the same nearly sinusoidal shape as the first current $i_1$. The near sinusoidal nature of currents $i_1$ and $i_2$ reduces current stresses on the power handling components 140 and also reduces high-order harmonics, thereby lowering conduction and core losses in the transformer $T_r$.

Graph 212 illustrates voltages $v_{La}$ and $v_{Lb}$ applied to the two inductors $L_a$ and $L_b$, along with the corresponding currents $i_{La}$ and $i_{Lb}$ flowing through the two inductors $L_a$ and $L_b$, respectively. The second AC voltage $v_{AC2}$ generated by the two interleaved switching networks 108, 110 applies an AC voltage $v_{La}$ and $v_{Lb}$ to each inductor that varies between the voltage $V_2$ of the second DC power source $P_2$ and the negative of that voltage $-V_2$. As can be seen in the graph 212, the two AC inductor voltages $v_{La}$ and $v_{Lb}$ have opposite polarity resulting in similarly shaped but opposite ripple currents $i_{La}$ and $i_{Lb}$ flowing through each inductor.

The current $i_{ab}$ flowing to the second DC power source $P_2$ is illustrated in the bottom graph 214. The similarly shaped but opposite ripple currents $i_{La}$ and $i_{Lb}$ flowing through the two inductors $L_a$ and $L_b$ cancel each other leaving a substantially ripple free DC current $i_{ab}$ which in certain embodiments becomes the output current of the second DC power source $I_{o2}$. Appropriate selection of values for the two inductors reduces ripple current at the output $I_{o2}$ and allows for a very small value link capacitor $C_{L2}$.

Creating an efficient and dense power converter requires both a suitable converter topology as well as an efficient control scheme. The converter topology 140 described above and with reference to FIG. 1 and FIG. 2 provides such a suitable converter topology. The following analysis will provide a basis for a simple and efficient control scheme.

As an aid to understanding, the converter topology 140 will be analysed by considering a forward power flow from the first DC power source $P_1$ on the HV side 102 to the second DC power source $P_2$ on the LV side 104 of the converter topology 140. The reverse power flow behaves similarly and an analysis of the reverse power flow follows directly from analysis of the forward power flow shown below. Symbols in the following analysis correspond to the elements of the apparatus 100 illustrated in FIG. 1 and described above.

Applying fundamental component analysis to the converter topology 140 yields the average power $P_2$ and current $I_{o2}$ at the LV side 104 shown in the following equations (1) and (2):

$$P_2 = \frac{2V_1^2 M \sin\theta}{\pi^2 Z_r}, \quad (1)$$

$$I_{o2} = \frac{8NV_1 \sin\theta}{\pi^2 Z_r}, \quad (2)$$

where $\theta$ is the phase shift between the first AC voltage $v_{AC1}$ and the second AC voltage $v_{AC2}$. Varying the phase shift $\theta$ over the range $-\pi/2 \leq \theta \leq +\pi/2$ determines the direction and magnitude of power and current flow between the HV side 102 and the LV side 104 of the apparatus 100. A positive phase shift $\theta$ causes power to flow from the HV side 102 to the LV side 104, and a negative phase shift $-\theta$ reverses the power flow.

Gain M across the resonant impedance $Z_r$ varies with the switching frequency $f_s$ and is given by equation (3):

$$M = \frac{4NV_{AC2}}{V_{AC1}}. \quad (3)$$

The value of the resonant impedance $Z_r$ is shown in equation (4):

$$Z_r = 2\pi f_s L_r - \frac{1}{2\pi f_s C_r}. \quad (4)$$

Conduction losses in the apparatus 100 are dependent on the root means square (RMS) values of a first current $i_1$ and a second current $i_2$, where the first current $i_1$ and second current $i_2$ are related by the transformer turn ratio N such that the first current $i_1$ is equal to the turn ratio N times the second current $i_2$, ($i_1 = N i_2$). The RMS value of the of the first current $I_{1rms}$ is given by equation (5):

$$I_{1rms} = \frac{\pi I_{o2} \times \sqrt{2M^2 - 4M\cos\theta + 2}}{8N \sin\theta}, \quad (5)$$

where the second current $I_{o2}$ is the current flowing through the second power $P_2$, which for the purposes of this analysis will be referred to as the output current.

It is important to minimize circulating currents during converter operation. To obtain the minimum circulating current, the first derivative with respect to phase shift $\theta$ of a ratio between the RMS value of the first current $I_{1rms}$ and the output current $I_{o2}$ is set to zero. Solving for the required values of phase shift $\theta$ yields the result is shown in equation (6):

$$\frac{\partial}{\partial \theta}\left(\frac{I_{1rms}}{I_{o2}}\right) = 0 \xrightarrow{yields} \theta = \begin{cases} \cos^{-1} M & \text{for } M \leq 1 \\ \cos^{-1} \frac{1}{M} & \text{for } M > 1 \end{cases}. \quad (6)$$

Substituting the result in equation (6) into equation (5) gives a relationship between the minimum RMS value of the first current $I_{1rm,min}$ and the output current $I_{o2}$ as shown in equation (7):

$$I_{1rms,min} = \frac{I_{2rms,min}}{N} = \begin{cases} \dfrac{\pi I_{o2} \times \sqrt{2}}{8N} & \text{for } M \leq 1 \\ \dfrac{\pi M I_{o2} \times \sqrt{2}}{8N} & \text{for } M > 1 \end{cases}. \quad (7)$$

Equation (7) shows that for gain M greater than 1 (M>1), the minimum RMS current $I_{1rm,min}$ increases proportionally with an increase in the gain M. Therefore, in certain embodiments it may be desirable to select the transformer turn ratio N based on equation (3) to keep the gain M less than or equal to 1 (M≤1). Substituting equation (6) into equation (2) gives a relationship for the output current $I_{o2}$ as a function of the gain M as shown in equation (8):

$$I_{o2} = \begin{cases} \dfrac{8NV_1 \times \sqrt{1-M^2}}{\pi^2 Z} & \text{for } M \leq 1 \\ \dfrac{8NV_1 \times \sqrt{1-\dfrac{1}{M^2}}}{\pi^2 Z} & \text{for } M > 1 \end{cases}. \quad (8)$$

An important consideration for efficient power converter design is ZVS operation of the switching networks 106, 108, 110. With a gain of one (M=1) equation (6) shows the phase shift is zero (θ=0) and equation (8) shows the output current is zero ($I_{o2}$=0). To avoid this condition the phase shift θ should be limited to a minimum value in a small region near the gain of one (M=1). A region can be defined where the gain M is greater than a minimum threshold value $M_1$ and less than a maximum threshold value $M_2$, where $M_1$ is less than 1 and $M_2$ is greater than 1 i.e., $M_1 \leq M \leq M_2$. The phase shift θ can then be held constant within this region as shown in equation (9):

$$\theta_{min} = \cos^{-1} M_{max1} \quad (9).$$

Equations (6) and (9) can be combined to give a complete definition of the phase shift over the full range of gain M as shown in equation (10):

$$\theta = \begin{cases} \cos^{-1} M & \text{for} \quad M < M_{max1} \\ \cos^{-1} M_{max1} & \text{for} \quad M_{max1} \leq M \leq M_{max2} \\ \cos^{-1} \frac{1}{M} & \text{for} \quad M > M_{max2} \end{cases} \quad (10)$$

Figure 3:
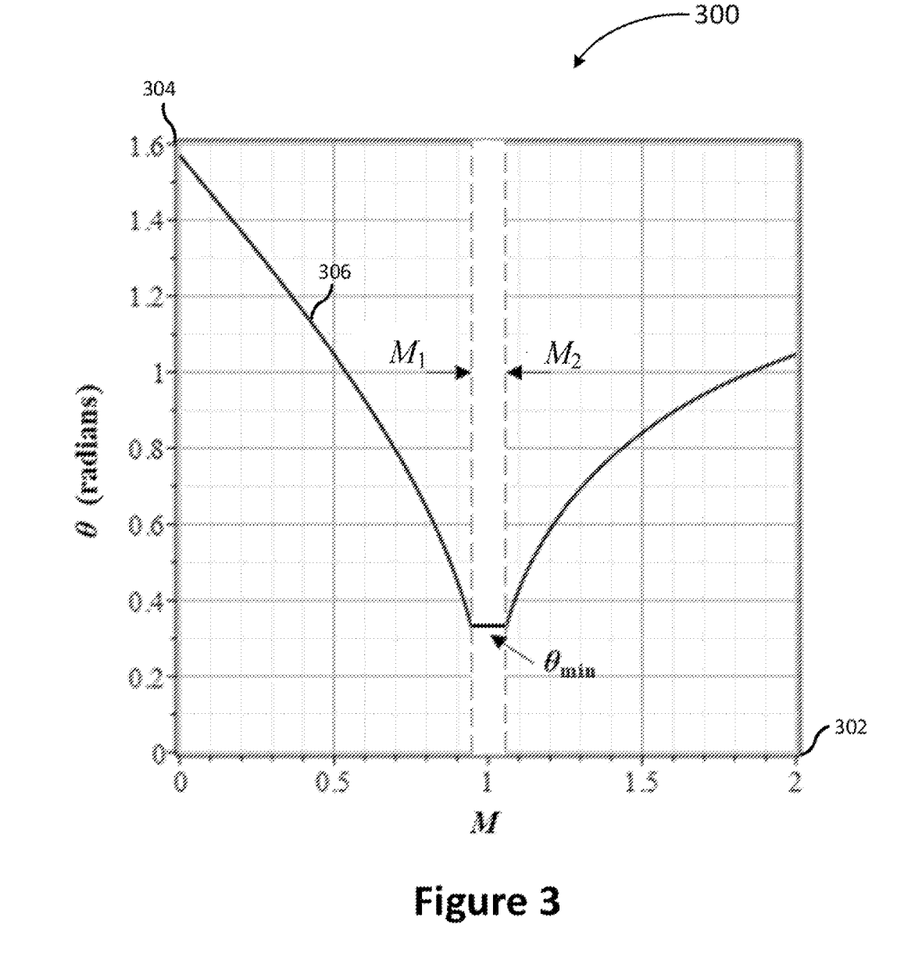
FIG. 3 illustrates a graph showing the relationship between a gain across the resonant network and a phase shift DC-DC power converter incorporating aspects of the embodiments.

FIG. 3 illustrates a graph 300 showing the relationship between gain M and phase shift θ in an apparatus 100 incorporating aspects of the embodiments. The graph 300 depicts the gain M along a horizontal axis 302 increasing to the right, and phase shift θ in radians along a vertical axis 304 increasing upward. The phase relationship 306 depicted in the graph 300 is defined by equation (10) described above. As can be seen in the graph 300, the phase shift θ is a piecewise continuous curve with a minimum phase shift $\theta_{min}$ being imposed in a region around a gain M of one.

ZVS operation of the HV side 102 switches $S_1$ and $S_2$ depends on the minimum phase shift $\theta_{min}$, or more particularly, the inductor current $i_1$ during the first dead time $t_{d1}$. This minimum phase shift $\theta_{min}$ depends on the minimum gain threshold $M_1$ as show in equation (11):

$$M_1 = \frac{\sqrt{(\pi I_{o2,min,zvs} t_{d1})^2 - (8NQ_{1,max})^2}}{\pi I_{o2,min,zvs} t_{d1}}, \quad (11)$$

where $I_{o2,min,zvs}$ is the minimum output current at LV side 104 above which ZVS at HV side 102 is guaranteed, and $Q_{1,max}$ is the maximum charge stored on the parasitic output capacitance $C_{oss1}$ of the first HV side switching device $S_1$. The second gain threshold $M_2$ can now be evaluated based on equations (9) and (11) as shown in equation (12):

$$M_2 = \frac{1}{\cos(\theta_{min})} = \frac{1}{M_1}. \quad (12)$$

In the region between the minimum gain threshold $M_1$ and the maximum gain threshold $M_2$, the HV side switching devices $S_1$ and $S_2$ may not be able to achieve ZVS switching. However, zero current switching (ZCS) operation can be guaranteed. ZCS is less desirable than ZVS but is still better than hard switching operation.

ZVS operation for the LV-side switches $S_3$ through $S_6$ depends on current is through the first inductor $L_a$ and current $i_b$ through the second inductor $L_b$. The first inductor $L_a$ and the second inductor $L_b$ should have equal value to minimize output current ripple. Thus, in certain embodiments the value of the first inductor $L_a$ and the second inductor $L_b$ can be determined using equation (13), $$L_a = L_b = \frac{V_{2,min} t_{d2}}{2 f'_s (8 V_{2,min} C_{oss3} + I_{o2,max} t_{d2})}, \quad (13)$$

where $I_{o2,max}$ is the maximum output current at LV side 104, $t_{d2}$ is the dead time between the third and fourth switching devices $S_3$, $S_4$ and between the fifth and sixth switching devices $S_5$, $S_6$, $V_{2,min}$ is the given minimum value of LV-side voltage $V_2$, f's is the switching frequency to achieve the desired maximum output current $I_{o2,max}$ at $V_{2,min}$, and $C_{oss3}$ is the parasitic output capacitance of the LV-side switching devices $S_3$, $S_4$, $S_5$, $S_6$.

An important consideration for design of the apparatus 100 is the choice of the resonant impedance $Z_r$. The minimum required impedance $Z_{min}$ to deliver the desired maximum output current $I_{o2,max}$ can be calculated for the minimum gain threshold $M_1$ and minimum input voltage $V_{1,min}$ as shown in equation (14):

$$Z_{min} = \frac{8NV_{1,min} \times \sqrt{1 - M_{max1}^2}}{\pi^2 I_{o2,max}} = 2\pi f_{s,min} L - \frac{1}{2\pi f_{s,min} C}, \quad (14)$$

where $V_{1,min}$ is the given minimum input voltage and $f_{s,min}$ is the predetermined minimum switching frequency.

The resonance frequency $f_r$ of the resonant impedance $Z_r$ should be less than the minimum desired switching frequency, $f_r < f_s$, and is given by equation (15), $$f_r = \frac{1}{2\pi \sqrt{LC}}. \quad (15)$$

In one embodiment equations (14) and (15) may be solved simultaneously to determine suitable values for the resonant inductor Lr and the resonant capacitor Cr.

Figure 4:
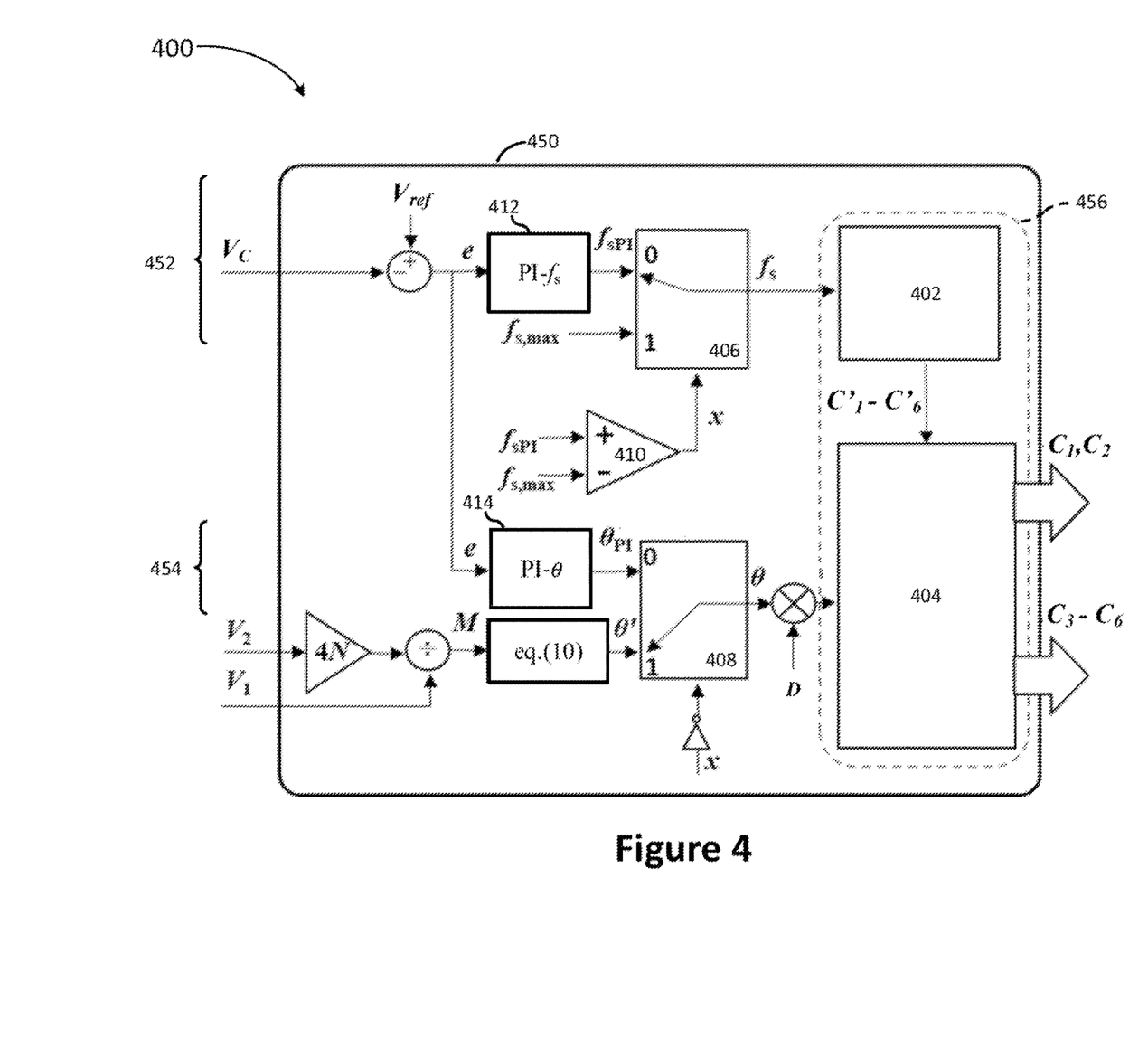
FIG. 4 illustrates a block diagram of an exemplary control scheme for a DC-DC power converter incorporating aspects of the embodiments.

FIG. 4 illustrates a block diagram of an exemplary control scheme 400 incorporating aspects of the embodiments. The exemplary control scheme 400 is appropriate for use as the controller 150 in the apparatus 100 described above and with reference to FIG. 1.

The exemplary control scheme 400 of the embodiments includes two control loops 452, 454 where the first control loop 452 generates a switching frequency $f_s$, and the second control loop 454 generates a phase shift θ. The exemplary first and second control loops 452, 454 are appropriate for use as the first and second control loops 152, 154 described above and with reference to FIG. 1. The control parameters, which are switching frequency $f_s$ and phase shift θ, are used by a control signal generator 456 to generate control signals $C_1, \ldots, C_6$ configured to drive three switching networks, such as the three switching networks 106, 108, 110 described above.

As used herein the term control loop refers to a feedback mechanism where a measured signal corresponding to the system output being controlled is compared with a reference signal to create an error signal, where the error signal represents a difference between the desired system output and the actual system output. The control loop uses the error signal to adjust values of one or more control parameters in a way that drives the actual system output toward the desired system output.

In the control scheme 400, an error signal e is determined by taking the difference between a reference voltage $V_{ref}$ and a controlled voltage $V_c$. The reference voltage $V_{ref}$ is set based on the desired output of the apparatus 100, and the controlled voltage $V_c$ is a measured value proportional to an output of the apparatus 100. The controlled voltage $V_c$ may be derived from differing system characteristics based on the desired converter operation. For example, with power flowing forward from the first DC power source $P_1$ to the second DC power source $P_2$, the controlled voltage $V_c$ may be set proportional to the second DC voltage $V_2$, thereby regulating or controlling a voltage $V_2$ of the second DC power source $P_2$. During reverse operation when power is flowing from the second DC power source $P_2$ to the first DC power source $P_1$, the controlled voltage $V_c$ may be set proportional to the first DC voltage $V_1$, thereby regulating or controlling a voltage $V_1$ of the first DC power source $P_1$. Alternatively, the control scheme 400 may be operated in a current control mode by setting the controlled voltage proportional to either the second DC current $I_{o2}$ or the first DC current $I_{o1}$ as desired. In the illustrated embodiment the same error signal e is shared by both the first control loop 452 and the second control loop 454.

The first control loop 452 applies a first compensation algorithm 412 to the error signal e to produce a determined switching frequency $f_{sPI}$. In the exemplary embodiment illustrated in FIG. 4 the first compensation algorithm 412 is a proportional plus integral (PI) control algorithm. Alternatively, any suitable compensation algorithm 412 may be advantageously employed without straying from the spirit and scope of the present embodiments.

A comparator 410 compares the determined switching frequency $f_{sPI}$ produced by the compensation algorithm 412 to a pre determined maximum switching frequency $f_{s,max}$ and generates a logic signal x having a value of logical zero (0) when the determined switching frequency $f_{sPI}$ is less than the maximum switching frequency $f_{s,max}$ and a value of logical one (1) otherwise. A multiplexer 406 selects the switching frequency $f_s$ based on the logic signal x. This results in a switching frequency $f_s$ equal to the determined switching frequency $f_{sPI}$ when the determined switching frequency $f_{sPI}$ is less than the pre-determined maximum switching frequency $f_{s,max}$ and a switching frequency $f_s$ equal to the maximum switching frequency $f_{s,max}$ when the determined switching frequency $f_{sPI}$ is not less than the maximum switching frequency $f_{s,max}$.

During primary converter operation, referred to herein as frequency-controlled mode, the determined switching frequency $f_{sPI}$ is below the maximum switching frequency $f_{s,max}$ and power flow is regulated by the first control loop 452. In this region, the phase shift θ is generated based on a gain M across the series resonance $Z_r$ as described in equation (10). The exemplary control scheme 400 calculates the gain M based on the first DC voltage $V_1$ and the second DC voltage $V_2$ using equation (3). Equation (10) is then applied along with the gain M to determine the computed phase shift θ'. A multiplexer 408 receives the logic signal x and sets the phase shift θ equal to the computed phase shift θ' when the determined switching frequency $f_{sPI}$ is below the maximum switching frequency $f_{s,max}$.

Direction of power flow, from the first DC power source $P_1$ to the second DC power source $P_2$ or from the second DC power source $P_2$ to the first DC power source $P_1$, is controlled by a direction signal D where the direction signal is configured to change the sign of the phase shift θ based on the desired power flow. As shown in the preceding analysis, a positive phase shift θ causes power to flow from the first DC power source $P_1$ to the second DC power source $P_2$, while a negative phase shift reverses the flow of power.

When the determined switching frequency $f_{sPI}$ is not below the maximum switching frequency $f_{s,max}$, the exemplary control scheme 400 sets the switching frequency $f_s$ to the maximum switching frequency $f_{s,max}$, and the controller 400 shifts to a phase-controlled mode. While the switching frequency $f_s$ is fixed at the maximum switching frequency $f_{s,max}$, the multiplexer 408 sets the phase shift θ to the determined phase shift $θ_{PI}$ and power flow is controlled with the determined phase shift $θ_{PI}$ produced by the second control loop 454.

The second control loop 454 applies a second compensation algorithm 414 to the error signal e to produce a determined phase shift $θ_{PI}$. The exemplary embodiment 400 is illustrated as having a PI compensation algorithm in the exemplary second compensation algorithm 414, however those skilled in the art will readily recognize that any suitable compensation algorithm may be advantageously employed in the compensation algorithm 414 without straying from the spirit and scope of the present embodiments.

The control signal generator 456 receives the switching frequency $f_s$ and the phase shift θ and produces control signals $C_1, \ldots, C_6$ configured to operate the three switching networks 106, 108, 110. In the exemplary control signal generator 456 the switching frequency $f_s$ is input to a voltage-controlled oscillator 402 to produce a first set of control signals $C'_1, \ldots, C'_6$ having the desired switching frequency. Pulse width modulation 404 is then applied to the first set of control signals $C'_1, \ldots, C'_6$ based on the phase shift θ to produce control signals $C_1, C_2$ to operate the first switching network 106 and control signals $C_3, C_4, C_5$, and $C_6$ to operate the second and third switching networks 108, 110.

The exemplary control scheme 400 may be implemented using digital circuitry such as a microcontroller unit. Alternatively, the exemplary control scheme 400 may be implemented using analog circuitry or through any suitable combination of analog and digital circuitry.

Figure 5:
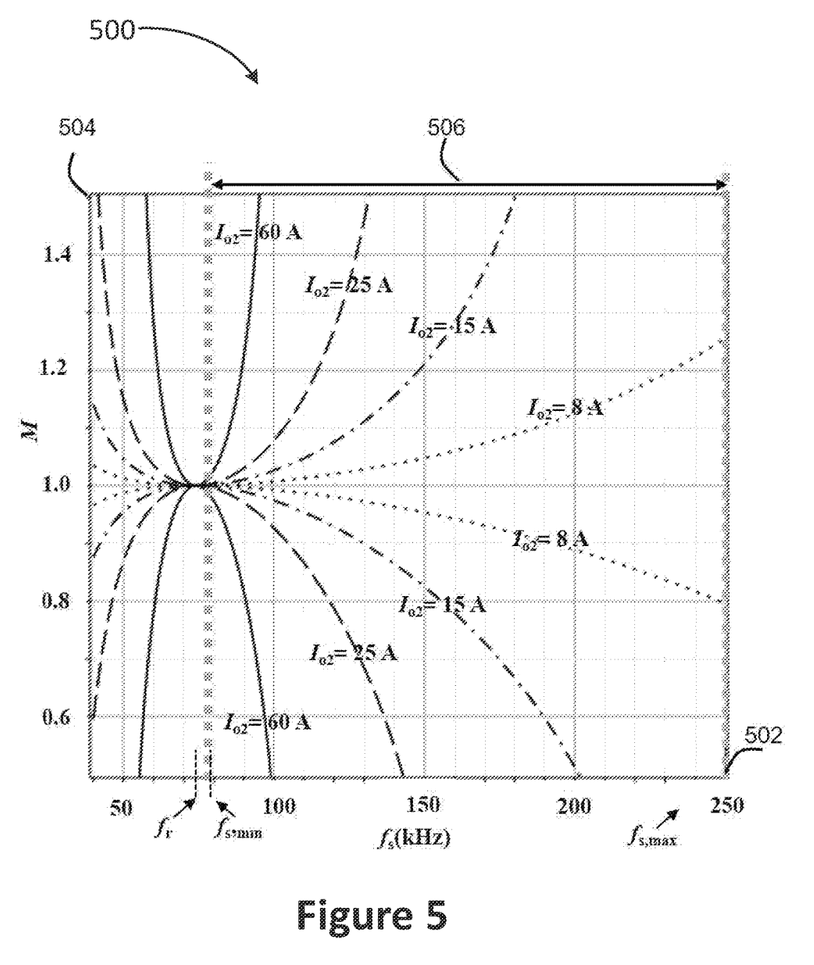
FIG. 5 illustrates graphs showing gain characteristics in the frequency-controlled operating region of an AHBR DC-DC power converter incorporating aspects of the embodiments.

FIG. 5 illustrates graphs 500 showing gain characteristics in the frequency-controlled operating region of an AHBR DC-DC power converter incorporating aspects of the embodiments. The graphs 500 illustrate operating characteristics of the control scheme 400 described above and with reference to FIG. 4 during the frequency controlled operating mode implemented by the first control loop 452. In the graph 500, switching frequency $f_s$ is depicted along a horizontal axis 502 with frequency increasing to the right, and the gain M is depicted along a vertical axis 504 increasing upward. The operating region for frequency-controlled mode is shown as interval 506 along the top of the graph 500. Each line shows the gain versus frequency curve for a particular value of output current. For example, the line labelled $I_{o2}$=15 A shows the gain vs frequency characteristic for an output current of fifteen (15) amps. The switching frequency $f_s$ is limited to a minimum value $f_{s,min}$ that is above the resonant frequency $f_r$ of the series resonant impedance $Z_r$. As can be seen from the graph 500, as output current $I_{o2}$ decreases, the switching frequency $f_s$ increases. This results in low values of output current, such as $I_{o2}$=0.8 A, where the maximum switching frequency $f_{s,max}$ can be reached. At that point, the control scheme 400 moves to a phase shift θ controlled mode handled by the second control loop 454.

Figure 6:
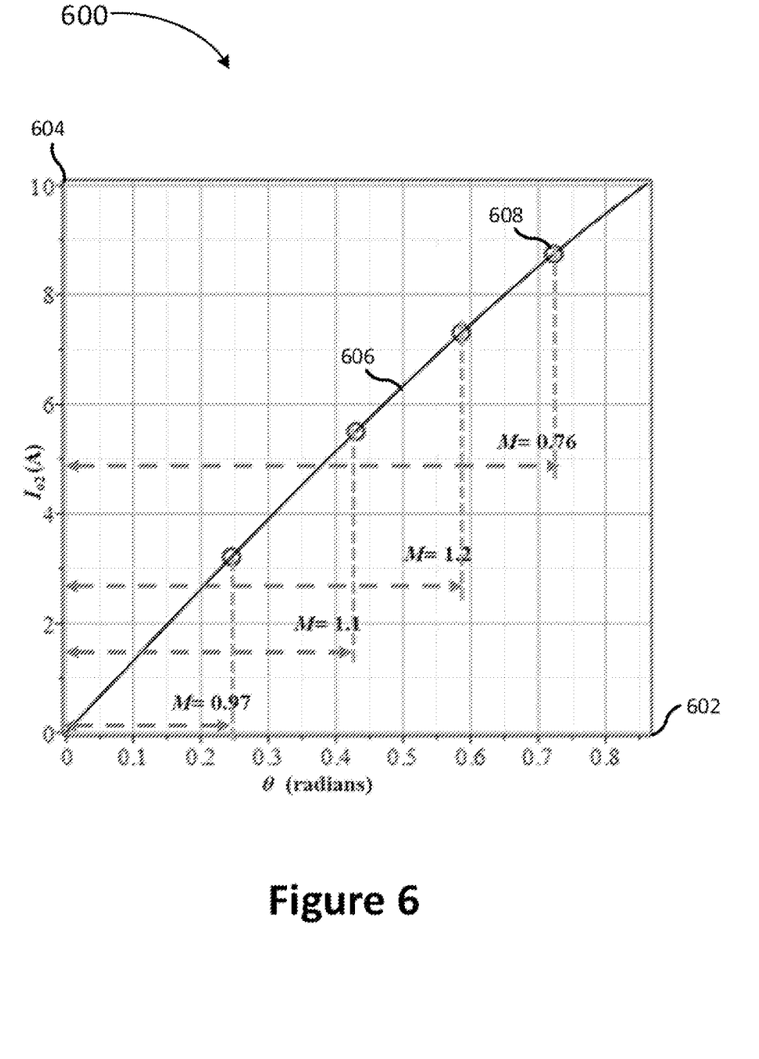
FIG. 6 illustrates a graph showing a relationship between phase shift and output current of an AHBR DC-DC power converter incorporating aspects of the embodiments.

FIG. 6 illustrates a graph 600 showing a relationship between phase shift and output current of an AHBR DC-DC power converter incorporating aspects of the embodiments. The graph 600 illustrates operating characteristics of the exemplary control scheme 400 when the switching frequency $f_s$ has reached it maximum value $f_{s,max}$ and the second control loop 454 is operating in a phase shift controlled mode. The graph 600 depicts phase shift in radians along a horizontal axis 602 increasing to the right and output current $I_{o2}$ in amps along a horizontal axis 604 increasing upwards. The curve 606 shows the conditions at which the control scheme 400 will switch from frequency-controlled mode to phase shift-controlled mode. When the determined switching frequency $f_{sPI}$ produced by the first compensation algorithm 412 reaches the maximum switching frequency $f_{s,max}$, the control scheme 400 transitions from the frequency-controlled mode regulated by the first control loop 452 to phase shift controlled mode regulated by the second control loop 454. The circles, such as the circle 608, along the line 606 represent points of output current and phase shift ($I_{o2}$, θ) which, for a particular value of gain M, the exemplary control scheme 400 would be required to shift from frequency-controlled mode to the phase-shift controlled mode. The second control loop 454 will then continue to reduce the phase shift θ until the desired output current $I_{o2}$ is reached.

Thus, while there have been shown, described and pointed out, fundamental novel features of the embodiments thereof, it will be understood that various omissions, substitutions and changes in the form and details of devices and methods illustrated, and in their operation, may be made by those skilled in the art without departing from the spirit and scope of the embodiments. Further, it is expressly intended that all combinations of those elements, which perform substantially the same function in substantially the same way to achieve the same results, are within the scope of the embodiments. Moreover, it should be recognized that structures and/or elements shown and/or described in connection with any form or embodiment may be incorporated in any other described or suggested form or embodiment.

What is claimed is:

1. An apparatus, comprising:
a first switching network connected between a first positive DC node and a first negative DC node, the first switching network comprising a first switching device connected in series with a second switching device and forming a first central node;
a resonant inductor, a resonant capacitor, and a first winding of a transformer connected in series between the first central node and the first negative DC node;
a first inductor and a second inductor connected in series between a first end and a second end of a second winding of the transformer, and forming a second positive DC node between the first inductor and the second inductor, wherein an inductance of the first inductor is equal to an inductance of the second inductor;
a second switching network connected in parallel with a first clamping capacitor, the second switching network comprising a third switching device connected in series with a fourth switching device and forming a second central node, wherein the second central node is connected with the first end;
a third switching network connected in parallel with a second clamping capacitor, the third switching network comprising a fifth switching device connected in series with a sixth switching device and forming a third central node, wherein the third central node is connected with the second end; and
a first DC power source connected between the first positive DC node and the first negative DC node; and
a second DC power source connected between the second positive DC node and the second negative DC node;
wherein the first clamping capacitor and the second clamping capacitor are connected with a second negative DC node,
wherein the inductance of the first inductor is determined based on a maximum current and a minimum voltage of the second DC power source, a switching frequency corresponding to the maximum current and the minimum voltage, and a parasitic capacitance of any of the third, fourth, fifth, and sixth switching devices.

2. The apparatus according to claim 1, wherein the first switching network is configured to create a first AC voltage across the first central node and the first negative DC node; and
the second switching network and the third switching network are configured to create a second AC voltage across the second central node and the third central node.

3. The apparatus according to claim 2, wherein the second switching network and the third switching network are configured to operate at a fifty percent duty cycle.

4. The apparatus according to claim 1, further comprising:
a controller configured to receive a first DC voltage corresponding to the first DC power source and a second DC voltage corresponding to the second DC power source, the controller comprising:
a first control loop configured to determine a switching frequency based on a controlled voltage and a reference voltage;
a second control loop configured to determine a phase shift between the first AC voltage and the second AC voltage based on the controlled voltage, the reference voltage, and a gain, wherein the gain is determined based on a first voltage of the first DC power source and a second voltage of the second DC power; and
a control signal generator configured to receive the switching frequency and the phase shift and generate control signals configured to operate the first switching network, the second switching network, and the third switching network in accordance with the switching frequency and the phase shift.

5. The apparatus according to claim 1, further comprising:
a controller configured to receive a first DC voltage corresponding to the first DC power source and a second DC voltage corresponding to the second DC power source, the controller comprising:
a first control loop configured to determine a switching frequency based on a controlled voltage and a reference voltage;
a second control loop configured to determine a phase shift between the first AC voltage and the second AC voltage based on the controlled voltage, the reference voltage, and a gain, wherein the gain is determined based on a first voltage of the first DC power and a second voltage of the second DC power; and
a control signal generator configured to receive the switching frequency and the phase shift and generate control signals configured to operate the first switching network, the second switching network, and the third switching network in accordance with the switching frequency and the phase shift.

6. The apparatus according to claim 2, further comprising:
a controller configured to receive a first DC voltage corresponding to the first DC power source and a second DC voltage corresponding to the second DC power source, the controller comprising:

a first control loop configured to determine a switching frequency based on a controlled voltage, and a reference voltage;

a second control loop configured to determine a phase shift between the first AC voltage and the second AC voltage based on the controlled voltage, the reference voltage, and a gain, wherein the gain is determined based on a first voltage of the first DC power and a second voltage of the second DC power; and a control signal generator configured to receive the switching frequency and the phase shift and generate control signals configured to operate the first switching network, the second switching network, and the third switching network in accordance with the switching frequency and the phase shift.

7. The apparatus according to claim 4, wherein the controlled voltage is proportional to one of the first voltage, the second voltage, a current of the first DC power, and a current of the second DC power.

8. The apparatus according to claim 5, wherein the controlled voltage is proportional to one of the first voltage, the second voltage, a current of the first DC power, and a current of the second DC power.

9. The apparatus according to claim 4, wherein, when the determined switching frequency is below a predetermined maximum switching frequency, the control signals are generated based on the switching frequency, and when the determined switching frequency is not below the predetermined maximum switching frequency, the control signals are generated based on the maximum switching frequency.

10. The apparatus according to claim 5, wherein, when the determined switching frequency is below a predetermined maximum switching frequency, the control signals are generated based on the switching frequency, and when the determined switching frequency is not below the predetermined maximum switching frequency, the control signals are generated based on the maximum switching frequency.

11. The apparatus according to claim 7, wherein, when the determined switching frequency is below a predetermined maximum switching frequency, the control signals are generated based on the switching frequency, and when the determined switching frequency is not below the predetermined maximum switching frequency, the control signals are generated based on the maximum switching frequency.

12. The apparatus according to claim 8, wherein, when the determined switching frequency is below a predetermined maximum switching frequency, the control signals are generated based on the switching frequency, and when the determined switching frequency is not below the predetermined maximum switching frequency, the control signals are generated based on the maximum switching frequency.

13. The apparatus according to claim 4, wherein, when the determined switching frequency is below the predetermined maximum switching frequency, the phase shift is generated based on the gain, and when the determined switching frequency is not below the predetermined maximum switching frequency, the phase shift is generated based on a difference between the controlled voltage and the reference voltage.

14. The apparatus according to claim 7, wherein, when the determined switching frequency is below the predetermined maximum switching frequency, the phase shift is generated based on the gain, and when the determined switching frequency is not below the predetermined maximum switching frequency, the phase shift is generated based on a difference between the controlled voltage and the reference voltage.

15. The apparatus according to claim 4, wherein:

when the gain is less than a first threshold value, the phase shift is set to an inverse cosine of the gain;

when the gain is between the first threshold value and the second threshold value, the phase shift is set to a predetermined minimum phase shift; and when the gain is greater than a second threshold value, the phase shift is set to an inverse cosine of an inverse of the gain.

16. The apparatus according to claim 15, wherein:

the first threshold value is determined based on a parasitic capacitance of any of the first switching device and the second switching device and a predetermined minimum value of an output current at the second DC power source; and the second threshold value is an inverse of the first threshold value.

17. The apparatus according to claim 16, wherein the parasitic capacitance of the first switching device and the second switching device is equal.

* * * * *